United States Patent
Vadapalli et al.

(10) Patent No.: US 11,861,624 B2
(45) Date of Patent: Jan. 2, 2024

(54) PROVIDING VIRTUAL SUPPORT TO AN END-USER BASED ON EXPERIENCE

(71) Applicant: INTERNATIONAL BUSINESS MACHINES CORPORATION, Armonk, NY (US)

(72) Inventors: Ratnakumar Vadapalli, Visakhapatnam (IN); Venkata Vara Prasad Karri, Visakhapatnam (IN); Sampath Kumar Pulupula Venkata, Visakhapatnam (IN); Madhukar Hari Kishan Gobbi, Visakhapatnam (IN); Lakshmi Kiran Nagireddi, Visakhaptnam (IN)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 17/202,532

(22) Filed: Mar. 16, 2021

(65) Prior Publication Data

US 2022/0300984 A1    Sep. 22, 2022

(51) Int. Cl.
*G06Q 10/0631* (2023.01)
*H04L 67/50* (2022.01)
(Continued)

(52) U.S. Cl.
CPC ........... *G06Q 30/016* (2013.01); *G06F 9/453* (2018.02); *G06F 11/0793* (2013.01);
(Continued)

(58) Field of Classification Search
CPC ......... G06Q 30/016; G06Q 10/063112; G06Q 10/20; G06F 11/0793; H04L 41/069;
(Continued)

(56) References Cited

U.S. PATENT DOCUMENTS 8,271,402 B2 * 9/2012 Fisher, Jr. ............. G06Q 10/10
706/45
10,223,646 B1    3/2019 Vontobel
(Continued)

FOREIGN PATENT DOCUMENTS

CA     3060464 A1 *  5/2020  ........... G06Q 30/016
EP     2369481 A2 *  9/2011  ........... G06F 11/0742
WO     2020027843 A1   2/2020

OTHER PUBLICATIONS

Y. Deng et al., "Advanced search system for IT support services," in IBM Journal of Research and Development, vol. 61, No. 1, pp. 3:27-3:40, Jan. 1-Feb. 2017, doi: 10.1147/JRD.2016.2628658. (Year: 2017).*

(Continued)

*Primary Examiner* — Crystol Stewart
(74) *Attorney, Agent, or Firm* — Steven M. Bouknight

(57) ABSTRACT

A method for automatically providing virtual support is provided. The method may include determining a level of experience associated with the end-user and members of a support personnel for a computer application. The method may further include, in response to detecting one or more first actions on the computer application, automatically generating and providing support instructions based on virtual support documentation to an end-user based on the one or more first actions and based on the level of experience associated with the end-user. The method may further include, in response to detecting one or more second actions on the computer application, automatically determining a match between a member of the support personnel and the end-user based on the level of experience associated with the end-user and the member of support personnel.

20 Claims, 6 Drawing Sheets

(51) Int. Cl.
*H04L 41/069* (2022.01)
*H04L 41/5074* (2022.01)
*G06F 11/07* (2006.01)
*H04L 41/5061* (2022.01)
*G06F 9/451* (2018.01)
*G06Q 30/016* (2023.01)
*G06Q 10/20* (2023.01)

(52) U.S. Cl.
CPC ..... *G06Q 10/063112* (2013.01); *G06Q 10/20* (2013.01); *H04L 41/069* (2013.01); *H04L 41/5064* (2013.01); *H04L 41/5074* (2013.01); *H04L 67/535* (2022.05); *H04M 2250/56* (2013.01)

(58) Field of Classification Search
CPC ............. H04L 41/5064; H04L 41/5074; H04L 67/535; H04M 2250/56
See application file for complete search history.

(56) References Cited

U.S. PATENT DOCUMENTS

| | | | | |
|---|---|---|---|---|
| 2008/0282204 | A1* | 11/2008 | Del Valle Lopez | G06F 9/453 715/866 |
| 2015/0312427 | A1 | 10/2015 | Roulland | |
| 2016/0239848 | A1* | 8/2016 | Chang | G06Q 30/016 |
| 2017/0091777 | A1* | 3/2017 | Bender | H04L 67/535 |
| 2017/0180219 | A1 | 6/2017 | Abuelsaad | |
| 2018/0227420 | A1* | 8/2018 | Burg | H04L 41/5064 |
| 2019/0158366 | A1* | 5/2019 | Higgins | G10L 25/63 |
| 2020/0204680 | A1 | 6/2020 | Prakash | |
| 2021/0014136 | A1* | 1/2021 | Rath | G06N 20/20 |
| 2021/0176625 | A1* | 6/2021 | Hurst | G06Q 10/20 |
| 2021/0337069 | A1* | 10/2021 | Niu | G06Q 10/063112 |
| 2022/0150221 | A1* | 5/2022 | Fiumara | G06Q 30/016 |
| 2022/0284901 | A1* | 9/2022 | Novitchenko | G10L 15/22 |
| 2022/0366277 | A1* | 11/2022 | DeFilippo | G06Q 30/016 |

OTHER PUBLICATIONS

R. Noor and F. A. Khan, "Personalized recommendation strategies in mobile educational systems," 2016 Sixth International Conference on Innovative Computing Technology (INTECH), Dublin, Ireland, 2016, pp. 435-440, doi: 10.1109/INTECH.2016.7845110. (Year: 2016).*

Mell et al., "The NIST Definition of Cloud Computing," National Institute of Standards and Technology, Special Publication 800-145, Sep. 2011, pp. 1-7.

* cited by examiner

PROVIDING VIRTUAL SUPPORT TO AN END-USER BASED ON EXPERIENCE

BACKGROUND

The present invention relates generally to the field of computing, and more specifically, to providing automatic help/support to an end-user that may be tailored for the end-user based on a determined level of experience associated with the end-user and support personnel.

Generally, a virtual help/support desk may allow organizations to virtually deploy support documentation and/or information technology (IT) support technicians on demand to support a user experiencing product and/or application issues. In turn, organizations can efficiently manage and allocate global support resources, including support documentation and support personnel, to any computer to despite the location of the end user or support representative. For example, virtual support allows IT representatives to virtually access end systems through support sessions where they can diagnose and fix computer issues quickly. This may eliminate in-person customer service calls and/or ineffective phone-only tech support sessions, making the virtual support more efficient. Another objective of the virtual support is to improve IT resource management and save an organization's money by increasing support efficiencies. Through an enhanced ability to allocate resources, organizations have the flexibility to create new ways of using its technical support knowledge-base, a technology which typically requires a software implementation. Thus, using a software program and/or cloud-based application, an end user may access product documentation and/or virtual support when the end user is in need of help with an issue.

SUMMARY

A method for automatically providing virtual support is provided. The method may include determining a level of experience associated with the end-user and members of a support personnel for a computer application. The method may further include, in response to detecting one or more first actions on the computer application, automatically generating and providing support instructions based on virtual support documentation to an end-user based on the one or more first actions and based on the level of experience associated with the end-user. The method may further include, in response to detecting one or more second actions on the computer application, automatically determining a match between a member of the support personnel and the end-user based on the level of experience associated with the end-user and the member of support personnel.

A computer system for automatically providing virtual support is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include determining a level of experience associated with the end-user and members of a support personnel for a computer application. The method may further include, in response to detecting one or more first actions on the computer application, automatically generating and providing support instructions based on virtual support documentation to an end-user based on the one or more first actions and based on the level of experience associated with the end-user. The method may further include, in response to detecting one or more second actions on the computer application, automatically determining a match between a member of the support personnel and the end-user based on the level of experience associated with the end-user and the member of support personnel.

A computer program product for automatically providing virtual support is provided. The computer program product may include one or more computer-readable storage devices and program instructions stored on at least one of the one or more tangible storage devices, the program instructions executable by a processor. The computer program product may include program instructions to determine a level of experience associated with the end-user and members of a support personnel for a computer application. The computer program product may include program instructions to, in response to detecting one or more first actions on the computer application, automatically generate and provide support instructions based on virtual support documentation to an end-user based on the one or more first actions and based on the level of experience associated with the end-user. The computer program product may include program instructions to, in response to detecting one or more second actions on the computer application, automatically determine a match between a member of the support personnel and the end-user based on the level of experience associated with the end-user and the member of support personnel.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
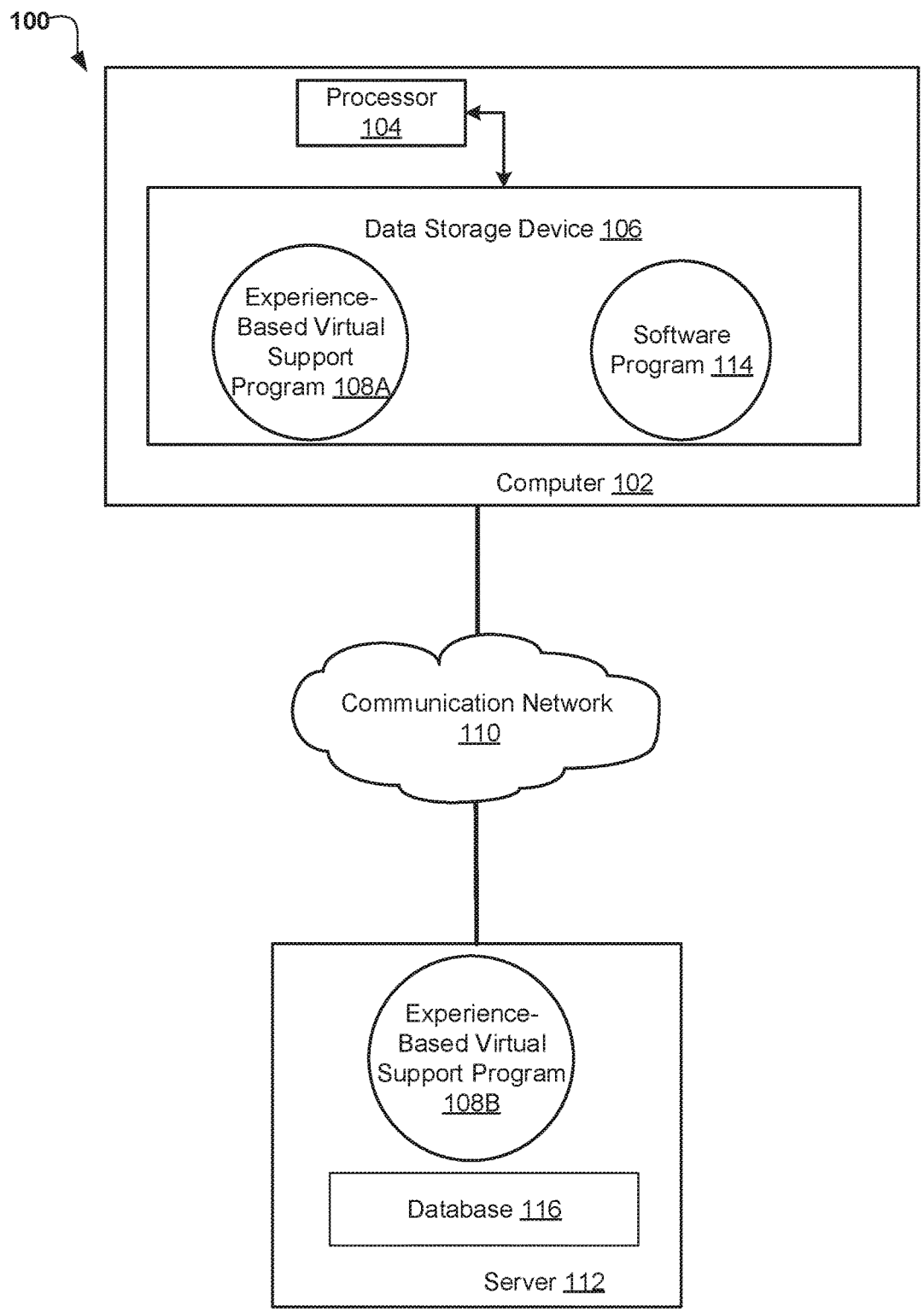
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

As previously described, embodiments of the present invention relate generally to the field of computing, and more particularly, to machine learning virtual support that provisions instructions support documentation and provides support personnel to an end-user based on a level of experience associated with the end-user and the support personnel. The method, computer system, and computer program product may improve the technical field associated with virtual support by tailoring the virtual support to the end-user based on a level of experience associated with the end-user. More specifically, the method, computer system, and computer program product may improve virtual support by determining a level of experience that an end-user and support personnel has with a particular product and/or application to better be able to provide an end-user with more competent instructions from support documentation with regard to the particular product and/or application and provide support personnel matching the end-user's level of experience.

As previously described with respect to virtual support, virtual support may allow organizations to virtually deploy support documentation and/or support technicians on demand. Specifically, using a software or cloud-based application, end users may access support documentation or contact support technicians when in need of help with something that the end user wants to achieve. For example, support documentation may be accessed by the end-user when trying to perform a set of steps but not achieving a desired result from performing those steps, or conversely, when wanting to achieve a specific result but not knowing the steps that are involved or how to perform those steps. Additionally, on the end-user side, different users of a product or application may have different levels of experience and knowledge of that product or application. However, for current practices, the virtual support documentation and/or the virtual support personnel that may address an end-user's call for help concerning a product or application typically includes a standard support document for all (i.e. in the case of support documentation) or a support technician who is chosen at random (i.e. in the case of support personnel). Therefore, the virtual support documentation may be the same for all users irrespective of the level of experience of the specific end-user. Furthermore, the level of experience of the virtual support personnel may not always be a right match for the end-user in need of help given a distance between knowledge associated with the end-user and the support personnel. Thus, the end-user may have to seek out options to resolve the end-user's issue, such as performing a keyword search on the virtual support documentation associated with a product and/or application. Consequently, current practices may lead to time loss, frustration, and misinformation to the client end-user.

As such, it may be advantageous, among other things, to provide a method, computer system, and computer program product for automatically providing virtual support by generating support instructions based on virtual support documentation, as well as matching virtual support personnel to an end-user, based on a level of experience associated with the end-user and the support personnel. Specifically, according to one embodiment, the method, computer system, and computer program product may include a machine learning algorithm that matches an end-user with support instructions from virtual support documentation as well as matches the end-user with support personnel based on a determined level of experience. For example, the method, computer system, and computer program product may determine the level of experience that an end-user and support personnel has for a specific product and/or application based on time spent with the product and/or application, activities performed with the product and/or application, training and/or certifications attended by the end-user and support personnel concerning the product and/or application, as well as other factors. In turn, based on the factors and information used to determine the level of experience of the end-user and the support personnel, the method, computer system, and computer program product may determine an experience score for the end-user and members of the support personnel. Thereafter, the method, computer system, and computer program product may automatically providing virtual support by generating support instructions based on virtual support documentation, as well as matching virtual support personnel to an end-user, based on the experience score associated with the end-user and the support personnel.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, an exemplary networked computer environment 100 in accordance with one embodiment is depicted. The networked computer environment 100 may include a computer 102 with a processor 104 and a data storage device 106 that is enabled to run an experience-based virtual support program 108A and a software program 114, and may also include a microphone (not shown). The software program 114 may be an application program such as an internet program, internet service, and/or one or more programs and applications running on a client computer 102, such as a desktop, laptop, tablet, internet of things (IoT) device, and mobile phone device. The experience-based virtual support program 108A may communicate with the software program 114. The networked computer environment 100 may also include a server 112 that is enabled to run an experience-based virtual support program 108B and the communication network 110. The networked computer environment 100 may include a plurality of computers 102 and servers 112, only one of which is shown for illustrative brevity. For example, the plurality of computers 102 may include a plurality of interconnected devices, such as the mobile phone, tablet, and laptop, associated with one or more users.

According to at least one implementation, the present embodiment may also include a database 116, which may be running on server 112. The communication network 110 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 4, server computer 112 may include internal components 800a and external components 900a, respectively, and client computer 102 may include internal components 800b and external components 900b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, an internet of things (IoT) device, a mobile device, a telephone, a personal digital assistant, a netbook, a laptop computer, a tablet computer, a desktop computer, or any type of computing device capable of running a program and accessing a network. According to various implementations of the present embodiment, the experience-based virtual support program 108A, 108B may interact with a database 116 that may be embedded in various storage devices, such as, but not limited to, a mobile device 102, a networked server 112, or a cloud storage service.

According to the present embodiment, a program, such as an experience-based virtual support program 108A and 108B may run on the client computer 102 and/or on the server computer 112 via a communications network 110. The experience-based virtual support program 108A, 108B may provide virtual support by generating instructions based on virtual support documentation, and/or may provide support personnel to an end-user, based on a level of experience associated with the end-user and the support personnel. Specifically, a user using a client computer 102 may run an experience-based virtual support program 108A, 108B that may interact with a software program 114, such as an internet or application program, to match an end-user with support instructions based on virtual support documentation, as well as match the end-user with support personnel, based on a level of experience. For example, experience-based virtual support program 108A, 108B may determine the level of experience based on information such as time spent with a product and/or application at issue, activities performed with a product and/or application at issue, training and/or certifications attended by the end-user and support personnel concerning the product and/or application at issue, as well as other factors. In turn, based on the factors and information used to determine the level of experience of the end-user and the support personnel, the experience-based virtual support program 108A, 108B may provide an end-user with support instructions based on virtual support documentation as well as provide support personnel based on the end-user's level of experience.

Figure 2:
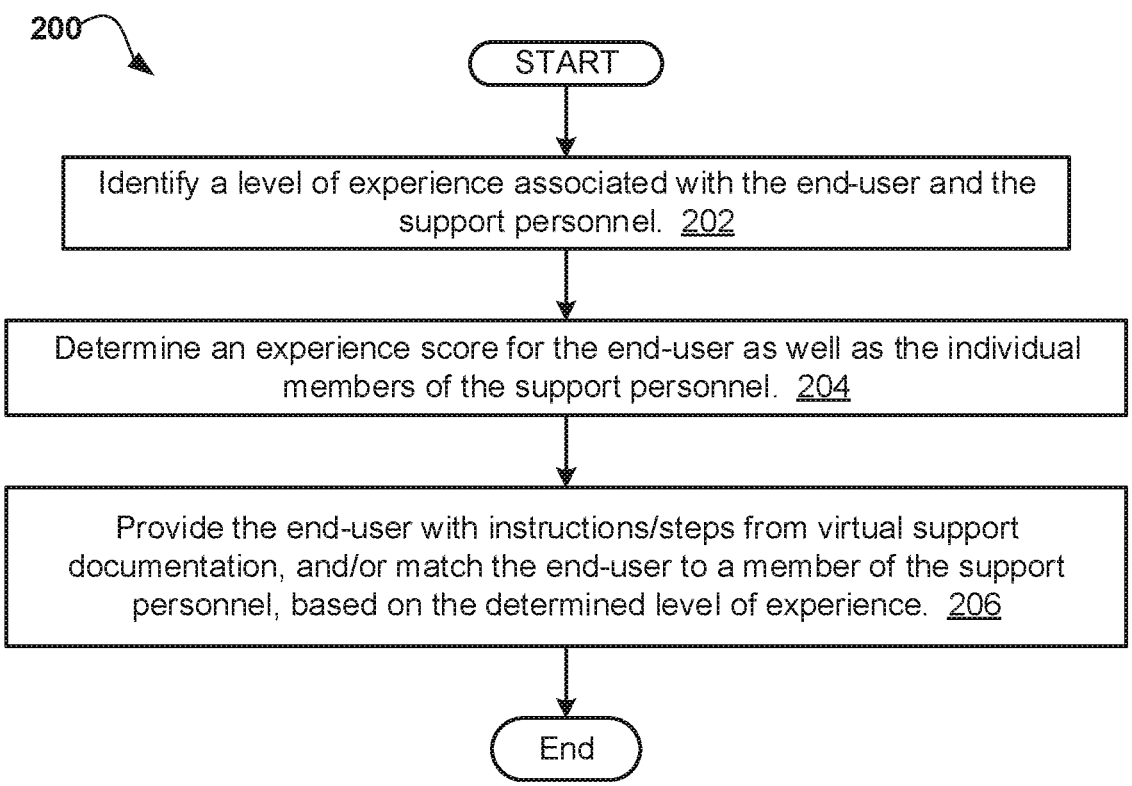
FIG. 2 is an operational flowchart illustrating the steps carried out by a program for providing machine learning virtual help feedback to an end-user based on a level of experience associated with the end-user and support personnel according to one embodiment.

Referring now to FIG. 2, an operational flowchart illustrating the steps carried out by a program for automatically providing virtual support is depicted. Specifically, at 202, the experience-based virtual support program 108A, 108B may identify a level of experience associated with the end-user and members of the support personnel. More specifically, for example, the end-user may be a user that uses a product and/or software program 114 and may be seeking support in response to experiencing an error and/or issue with the product and/or application. According to one embodiment, and as previously described, the software program 114 may be an application program such as an internet program, internet service, and/or one or more programs, product-related programs and applications running on a client computer 102. The software program 114 may also be associated with an IoT device where, as previously described, client computer 102 may be an IoT device. Also, according to one embodiment, the support personnel may be a member of a support staff that may, for example, be virtually deployed via a chat interface/bot by the experience-based virtual support program 108A, 108B on the software program 114 to resolve the error/issues that the end-user may encounter. Specifically, the experience-based virtual support program 108A, 108B may use the chat interface/bot to communicate with the end-user such as by providing instructions to the end-user and providing support personnel to the end-user.

Accordingly, to identify a level of experience associated with the end-user and members of the support personnel, the experience-based virtual support program 108A, 108B may track and log interactions between the end-user, the support personnel, and the software program 114. For example, the experience-based virtual support program 108A, 108B may use data mining and machine learning techniques to track, log, and categorize interactions between the end-user and the software program 114, interactions between the support personnel and the software program 114, and interactions between the end-user and the support personnel. According to one embodiment, the data mining techniques that may be used by the experience-based virtual support program 108A, 108B may include, but are not limited to, a C4.5 algorithm, a K-mean algorithm, support vector machines, an Apriori algorithm, etc. Also, according to one embodiment, the machine learning techniques that may be used by the experience-based virtual support program 108A, 108B may include, but are not limited to, linear regression, logistic regression, decision tree, random forest, etc. Accordingly, the experience-based virtual support program 108A, 108B may use a combination of the data mining techniques and the machine learning techniques to generate a data mining and machine learning model, such as an experience level determination model, that may track, log, and categorize information/interactions between the end-user, the support personnel, and the software program 114. In turn, the experience-based virtual support program 108A, 108B may store the logged data on, for example, data storage device 106 and/or database 116.

More specifically, the experience-based virtual support program 108A, 108B may identify a level of experience associated with the end-user by detecting, tracking, and logging information about the end-user. For example, the experience-based virtual support program 108A, 108B may track and log trainings and certifications received and/or attended by the end-user that are relevant to an application/product/service 114, such as by tracking and logging a number of virtual (i.e. computer-based and/or online) workshops/training offered by an application/product/service 114 and/or attended by the end-user, or application lessons/ credits received by the end-user that are relevant to the application/product/service 114. According to one embodiment, the experience-based virtual support program 108A, 108B may also track an amount of time that the end-user has spent using the application/product/service 114, for example, by tracking and logging a number of years/hours/days an end-user has spent with an application/product/service 114. Also, according to one embodiment, the experience-based virtual support program 108A, 108B may track and log specific actions taken by the end-user when using the application/product/service 114, for example, by tracking and logging activities/actions that the end-user has previously performed and/or is currently performing using the application/product/service 114. Furthermore, according to one embodiment, the experience-based virtual support program 108A, 108B may track and log any prior feedback (such as net promoter score, or NPS) that the end-user has provided based on previous experiences and/or interactions with the application/product/service 114, and/or based on previous experience and/or interactions with support personnel.

Similarly, the experience-based virtual support program 108A, 108B may identify a level of experience associated with individual members of virtual support personnel by tracking and/or logging information associated with the individual members of the support personnel such as tracking and logging: trainings and certifications received and/or attended by a member of the support personnel relevant to the application/product/service 114 (for example, number of virtual workshops/training attended or lessons/credits gained); an amount of time the member of the support personnel has spent using, reviewing, and/or supporting the application/product/service 114; previous support provided by the member of the support personnel to end-users (i.e. what type/category of support); an amount of end-users that the member of the support personnel has supported; and a type of feedback/rating the support personnel has received from the end-users (i.e. positive feedback or negative feedback).

Furthermore, the experience-based virtual support program 108A, 108B may use the experience level determination model to classify/categorize the logged data when storing the logged data in the data storage device 106 and/or database 116 (which may include a database table), and furthermore, may classify/categorize logged issues associated with the application/product/service 114. For example, the experience-based virtual support program 108A, 108B may categorize the tracked and logged data associated with the end-user and the support personnel such as by categorizing the logged training data for a specific end-user as "training data", categorizing the amount of time by the end-user spent as "amount of time spent," etc. Also, for example, an end-user may have experienced an error when using the application/product/service 114, such as an "object exception error" (other issues may include "user side network error" or "latency error"). Thus, for example, the experience-based virtual support program 108A, 108B may generate a category, such as category labeled application/product/service issues, and a subcategory, such as "object exception error." Furthermore, the experience-based virtual support program 108A, 108B may log and associate all activities that are related to the "object objection error" such as by tracking and logging the steps taken by the end-user that may have led to the "object exception error," and tracking and logging how the error was resolved (i.e. tracking the instructions provided by virtual support, and/or tracking the actions taken by support personnel). Therefore, all such activities related to an "object exception error" may be added to that category. As such, the experience-based virtual support program 108A, 108B may dynamically track and log, as well as categorically store on a database table, information associated with the end-user, the virtual support personnel, and the application/product/service 114.

Next, at 204, based on the tracked and logged information associated with the end-user and the virtual support personnel at 202, the experience-based virtual support program 108A, 108B may determine an experience score for the end-user as well as an experience score for the individual members of the support personnel. Specifically, the experience-based virtual support program 108A, 108B may use the tracked and logged information to assign a score and/or rate the level of experience associated with the end-user and the members of the support personnel. For example, according to one embodiment, the experience-based virtual support program 108A, 108B may use the experience score to determine whether the end-user and members of the support personnel have low-level experience, mid-level experience, or high-level of experience with regard to a certain application/product/service 114. More specifically, and according to one embodiment, the experience-based virtual support program 108A, 108B may generate the experience score using the tracked and logged data associated with the end-user and the members of the support personnel Also, according to one embodiment, when scoring the end-user and the individual members of the support personnel, the experience-based virtual support program 108A, 108B may weigh certain types of tracked and logged data over other types of tracked and logged data with regard to the end-user and the members of the support personnel, which may be configurable. Furthermore, for example, the experience-based virtual support program 108A, 108B may use a scoring system, or rating system, of 1-10 to assign an experience score to the end-user and members of the support personnel, where the higher the score the greater level of experience. For example, an experience score between the range of 1-3 may represent low experience, an experience score between the range of 4-7 may represent mid-level experience, and an experience score between the range of 8-10 may represent a high level of experience.

For example, for a given application 114, the experience-based virtual support program 108A, 108B may detect whether an end-user has low-level experience, mid-level experience, or high-level experience with the application 114 based on an amount of time the end-user has spent using the application 114, based on training modules that the end-user may have taken, and based on the specific actions the user may have performed on the application 114. Thus, while the end-user may have only taken 1 out 10 training modules, the experience-based virtual support program 108A, 108B may detect that the end-user has been using the application 114 daily for 3 years and may detect that the end-user has performed numerous actions and/or has used a number of different features on the application 114. As previously described, the experience-based virtual support program 108A, 108B may use a scoring system, or rating system, of 1-10 to assign an experience score to the end-user, where the higher the score the greater level of experience is associated with the end-user. Specifically, and as previously described, an experience score between the range of 1-3 may represent low-level experience, an experience score between the range of 4-7 may represent mid-level experience, and an experience score between the range of 8-10 may represent high-level experience. In turn, based on the tracked and logged information, the experience-based virtual support program 108A, 108B may assign a score of 8 between the scoring range of 1 and 10, whereby, according to one configurable embodiment, the experience-based virtual support program 108A, 108B may weigh the amount of time spent with the application/product/service 114, as well as the actions and features performed by the end-user, more heavily in determining the experience score than the training modules taken by the end-user.

Similarly, the experience-based virtual support program 108A, 108B may score the members of the support personnel. For example, for the given application 114, the experience-based virtual support program 108A, 108B may detect that a member of the support personnel may have high-level of experience as a supporter of the application 114 based on the number of trainings and certifications received and/or attended by the member of the support personnel (such as attending 10 out of 10 training sessions) that are relevant to the application 114 as well as based on a number of positive feedback/reviews received from previously supported end-users (such as receiving a 5.0 out of 5.0 rating from over 50 previously supported end-users). Accordingly, the experience-based virtual support program 108A, 108B may assign a score of 10 between the scoring range of 1 and 10 to the member of the support personnel. Thus, according to one embodiment, the experience-based virtual support program 108A, 108B may use a similar scoring/rating scale associated with end-users, where an experience score between the range of 8-10 may represent high-level experience, and therefore, determine that the member of the support personnel has high-level experience.

Then, at 206, and as will be described in greater detail with respect to FIG. 3, based on the determined experience scores for the end-user and each of the individual members of the support personnel, the experience-based virtual support program 108A, 108B may generate and provide the end-user with instructions/steps based on virtual support documentation associated with the application/product/service 114, and/or match the end-user to a member of the support personnel, based on the determined level of experience associated with the end-user and the members of the support personnel.

Figure 3:
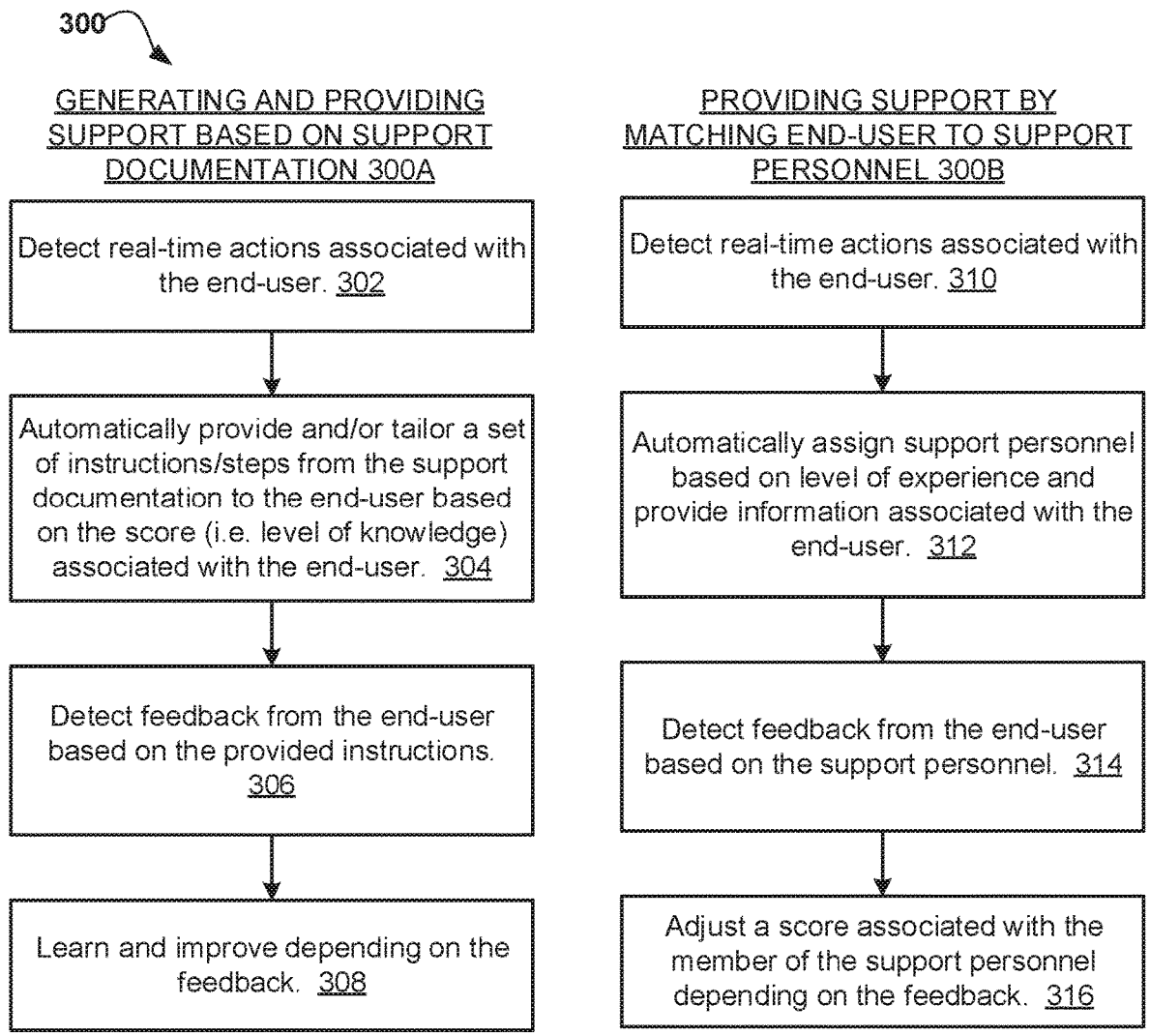
FIG. 3 are operational flowcharts for providing an end-user with a set of instructions/steps from virtual support documentation, as well as matching the end-user to a member of support personnel, based on a determined level of experience according to one embodiment.

Specifically, and referring now to FIG. 3, operational flowcharts 300A and 300B for matching and providing the end-user with a set of instructions/steps based on virtual support documentation associated with an application/product/service 114 and matching the end-user to a member of the support personnel are depicted, respectively. More specifically, at 302, when providing the end-user with a set of instructions/steps based on virtual support documentation 300A, the experience-based virtual support program 108A, 108B may first detect, in real-time, the actions that are specifically being performed by the end-user with regard to the application/product/service 114. As previously described, the experience-based virtual support program 108A, 108B may track and log specific actions taken by the end-user when using the application/product/service 114, for example, by tracking and logging activities that the end-user has previously performed and/or is currently performing using or on the application/product/service 114.

However, the experience-based virtual support program 108A, 108B may detect that the end-user is encountering a problem, whereby the problem may be a received error as a result of performing specific actions, and/or the problem may be based on a detection by the experience-based virtual support program 108A, 108B that the end-user may be receiving undesired results from specifically performed actions. For example, the experience-based virtual support program 108A, 108B may detect that the end-user is getting undesired results by determining that the end-user is continuously repeating actions (the amount of times the actions are repeated before determining whether the end-user may be encountering a problem may be based on a configurable threshold, such as actions that are repeated 3 times may trigger that the end-user is getting undesired results). In either case, at 304, and in response to detecting a problem based on the tracked activities, the experience-based virtual support program 108A, 108B may automatically provide and/or tailor a set of instructions/steps from the support documentation to the end-user based on the tracked activities and the experience score (i.e. level of experience) associated with the end-user.

More specifically, and according to one embodiment, the experience-based virtual support program 108A, 108B may detect a specific error that the user is encountering, and based on stored information about that specific error in database 116 and/or in virtual support documentation, may begin a process to provide, and/or tailor, a specific set instructions/steps to overcome the error based on the level of experience associated with the end-user. Also, according to one embodiment, the experience-based virtual support program 108A, 108B may detect what the end-user is trying to currently accomplish on the application/product/service 114 by correlating the end-user's actions with the virtual support documentation that corresponds to the application/product/service 114. For example, the experience-based virtual support program 108A, 108B may determine whether the end-user's detected real-time actions may align with one or more instructions/steps from existing virtual support documentation. Specifically, and according to one embodiment, the experience-based virtual support program 108A, 108B may use machine learning techniques and natural language processing techniques to detect the end-user's actions and determine, based on text within the virtual support documentation, whether those actions correspond to instructions/steps in the virtual support documentation. In turn, and according to one embodiment, the experience-based virtual support program 108A, 108B may determine a match between the end-user's real-time actions and instructions/steps from the virtual support documentation based on a closest matched entry in the virtual support documentation and/or based on a threshold percentage level (such as determining whether one or more entries in the virtual support documentation has a high percentage of being match with the end-user's real-time actions).

Accordingly, in response to determining that one or more real-time actions performed by the end-user may match one or more instructions/steps from the virtual support documentation, the experience-based virtual support program 108A, 108B may determine a specific result and/or a course action that the end-user may be trying to achieve based on the real-time actions. According to one embodiment, the experience-based virtual support program 108A, 108B may detect more than one result and/or course of action (i.e. different sets of instructions/steps that may or may not correspond to different solutions/results) such as by determining that the user's real-time actions may align with 2 or 3 prospective results and/or courses of actions based on the virtual support documentation. For example, and according to one embodiment, the experience-based virtual support program 108A, 108B may provide a top 3 results based on a threshold percentage level, whereby the experience-based virtual support program 108A, 108B may determine that the top 3 results or courses of action align most with the end-user's real-time actions percentage-wise. Furthermore, and as previously described at 204 (FIG. 2), the experience-based virtual support program 108A, 108B may detect the experience score associated with the end-user.

As such, based on the matching one or more instructions/steps from the virtual support documentation (derived from the end-user's actions and/or based on an encountered error) as well as the experience score associated with the end-user, the experience-based virtual support program 108A, 108B may automatically generate and provide a tailored set of instructions/steps to the end-user based on the support documentation. Specifically, according to one embodiment, although the steps/instructions generated by the experience-based virtual support program 108A, 108B may be based on the virtual support documentation, the experience-based virtual support program 108A, 108B may alter the instructions using machine learning and natural processing techniques based on the experience level/score of the end-user by, for example: using simpler terms than the virtual support documentation to describe the instructions for low-level experience or mid-level experience end-users, using lesser terms and/or lesser steps than the virtual support documentation to describe the instructions for high-level experienced end-users, separating certain steps/instructions provided by the virtual support documentation into more steps to make the steps easier to follow for low-level experienced end-users.

Therefore, according to one embodiment, the end-user need not perform a search on the virtual support documentation using keywords. The experience-based virtual support program 108A, 108B may automatically provide the end-user with a solution upfront by providing a set of instructions through, for example, a chat interface/bot, that may display the tailored instructions to the end-user using text based on the end-user's level of experience and the end-user's real-time actions. For example, given an application 114, based on determining that the end-user has an experience score of 8, and based on the real-time detecting of the activities that the end-user is performing on the application 114 in trying to achieve a certain goal but is encountering an error, the experience-based virtual support program 108A, 108B may provide a higher, more technical level set of instructions to a high-level experienced end-user than to a novice, low-level experienced end-user of the application 114, and/or may provide shorter or less steps to the end-user given the high-level experience of the end-user with the application 114. According to one embodiment, the experience-based virtual support program 108A, 108B may also use augmented reality (AR), virtual reality (VR), and/or simulation techniques to provide the end-user with the instruction in a more hands-on approach to help the end-user.

Furthermore, at 306, according to one embodiment, the experience-based virtual support program 108A, 108B may receive feedback from the end-user on the relevance of the steps/instructions (i.e. solution) provided. As previously described, the experience-based virtual support program 108A, 108B may track and log end-user feedback which may include feedback resulting from instructions provided to the end-user based on virtual support. For example, in response to the experience-based virtual support program 108A, 108B providing 3 different courses of action (i.e. 3 different sets of steps that may or may not correspond to different solutions/results) as described at step 304, the experience-based virtual support program 108A, 108B may detect that the end-user may have chosen one of the courses of action, whereby the choice of that one course of action may be regarded as end-user feedback. Furthermore, according to one embodiment, the experience-based virtual support program 108A, 108B may detect end-user feedback that may include detecting further real-time actions taken by and/or associated with the end-user, such as detecting whether the end-user is performing the provided instructions/steps, detecting whether the end-user is still getting an error, and detecting whether the end-user is having trouble performing the steps (such as detecting that an end-user cannot get pass a certain step or is continually repeating a step). Also, according to one embodiment, in response to providing the steps/instructions, the experience-based virtual support program 108A, 108B may detect feedback by presenting the end-user with a user interface to enable the end-user to, for example, like or dislike, and/or rate the instructions provided by the experience-based virtual support program 108A, 108B. For example, the experience-based virtual support program 108A, 108B may include a like/dislike button with the provided instructions and/or on the chat interface/bot that is used to present the provided instructions. Also, for example, the experience-based virtual support program 108A, 108B may include a virtual survey with the provided instructions on the chat interface/bot.

In turn, at 308, the experience-based virtual support program 108A, 108B may use the provided feedback and machine learning techniques to learn and improve depending on the provided end-user feedback. Accordingly, based on the previous example, in response to the experience-based virtual support program 108A, 108B detecting that the end-user chose a specific course of action over other courses of action, the experience-based virtual support program 108A, 108B may determine to associate that chosen course of action/solution with the problem encountered by the end-user going forward. Thus, when that end-user, or end-users with similar levels of experience, encounter that same problem, the experience-based virtual support program 108A, 108B may present that same course of action (or when providing multiple courses of action, may provide that course of action among the different courses of actions as the highest rated course of action).

Alternatively, or additionally, at 300B, with respect to providing support personnel 300B to resolve an end-user's issue, the experience-based virtual support program 108A, 108B may determine to match and provide a member of support personnel with the end-user based on the end-user's level of experience. Specifically, at 310 in response to detecting an action by the end-user, the experience-based virtual support program 108A, 108B may initiate a process to identify a match between the end-user and support personnel based on a nearest matching experience score between the end-user and members of the support personnel. More specifically, according to one embodiment, the experience-based virtual support program 108A, 108B may enable an end-user to directly request to contact support personnel. For example, and as previously described, the experience-based virtual support program 108A, 108B may include a chat interface/bot which may be used to present the automatically generated instructions as described at step 304. Additionally, the experience-based virtual support program 108A, 108B may include on the chat interface/bot a selectable option/button to contact support personnel, whereby, in response to the end-user action selecting that option, the experience-based virtual support program 108A, 108B may begin a process of choosing a member of support personnel that may match the end-user's level of experience.

Also, according to one embodiment, the experience-based virtual support program 108A, 108B may automatically determine to provide a member of support personnel based on the end-user's feedback/response/actions to the provided instructions from step 306. For example, in response to detecting that the end-user has provided negative feedback (such as by pressing a dislike button, submitting a low rating, or filling out a virtual survey) toward the provided instructions at 304, and/or detecting that the end-user is simply experiencing difficulty performing the provided instructions, the experience-based virtual support program 108A, 108B may automatically provide a member of the support personnel.

Thus, at 312, in response to detecting an action, such as detecting a selection of the option to contact support personnel and/or detecting end-user feedback), the experience-based virtual support program 108A, 108B may identify a match between the end-user and support personnel based on a nearest matching experience score between the end-user and members of the support personnel, whereby the nearest matching experience score represents a range of experience scores that may provide a match between the end-user and the member of support personnel. More specifically, and as previously described at steps 202 and 204, the experience-based virtual support program 108A, 108B may determine experience scores for the end-user and members of support personnel. For example, based on the tracked and logged information, the experience-based virtual support program 108A, 108B may assign a score of 8 between the scoring range of 1 and 10, whereby, according to one configurable embodiment, an experience score between the range of 8-10 may represent a high level of experience. Accordingly, the experience-based virtual support program 108A, 108B may match and provide the end-user with a member of the support personnel who correspondingly has a high level of experience, or an experience score between the range of 8 and 10. According to one embodiment, the matching member of the support personnel may be provided virtually through the chat interface/bot (i.e. as a chat conversation, or instant messaging experience), and/or though other communication protocols such as voice over internet protocol (VoIP), internet telephony, broadband telephony, broadband phone service, and public switched telephone network (PSTN).

In addition to, or as part of, matching and providing the end-user with a member of support personnel, the experience-based virtual support program 108A, 108B may automatically and electronically provide the matching member of the support personnel with information associated with the end-user. For example, the experience-based virtual support program 108A, 108B may automatically and electronically provide, to the matching member of the support personnel, information such as the end-user's experience score, the current and/or previous actions/steps performed by the end-user, previous feedback from the end-user, and the instructions (if any) that has already been provided to the end-user. As such, the experience-based virtual support program 108A, 108B may preemptively prepare the matching member of the support personnel for resolving the end-user's issue based on the electronically provided information.

Furthermore, at 314, and according to one embodiment, the experience-based virtual support program 108A, 108B may receive feedback from the end-user based on the matching member of the support personnel and based on the support provided by the matching member of the support personnel. Specifically, and similar to the feedback received at step 306, the experience-based virtual support program 108A, 108B may receive feedback on the quality and/or relevance of the solution and service provided by the matching member of the support personnel. For example, the experience-based virtual support program 108A, 108B may present the end-user with a user interface to enable the end-user to, for example, like or dislike, and/or rate the instructions provided by the matching member of the support personnel.

In turn, at 316, the experience-based virtual support program 108A, 108B may use the received feedback to adjust a score associated with the member of the support personnel who provided support to the end-user. More specifically, the feedback received by the experience-based virtual support program 108A, 108B at 314 may positively affect or negatively affect the experience score associated with the member of the support personnel. For example, in response to receiving negative feedback from the end-user based on the instructions and/or service provided by the matching member of the support personnel, the experience-based virtual support program 108A, 108B may decrease the experience score for the matching member of the support personnel. Conversely, in response to receiving positive feedback from the end-user based on the instructions and/or service provided by the matching member of the support personnel, the experience-based virtual support program 108A, 108B may increase the experience score for the matching member of the support personnel.

It may be appreciated that FIGS. 1-3 provide only illustrations of one implementation and does not imply any limitations with regard to how different embodiments may be implemented. Many modifications to the depicted environments may be made based on design and implementation requirements.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
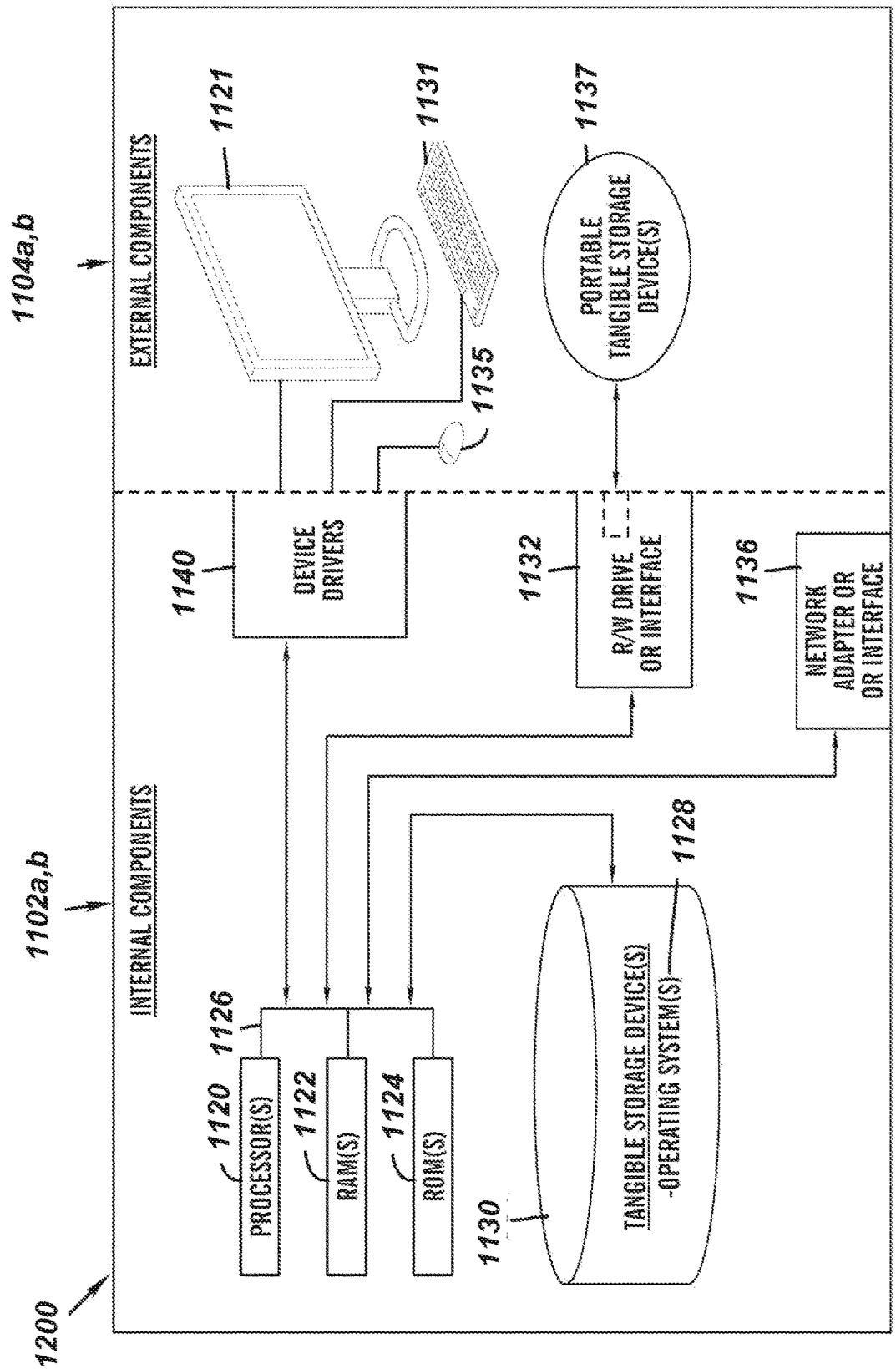
FIG. 4 is a block diagram of the system architecture of the program for automatically providing virtual support according to one embodiment.

FIG. 4 is a block diagram 1100 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 1102, 1104 is representative of any electronic device capable of executing machine-readable program instructions. Data processing system 1102, 1104 may be representative of a smart phone, a computer system, PDA, or other electronic devices. Examples of computing systems, environments, and/or configurations that may represented by data processing system 1102, 1104 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 1102 a, b and external components 1104 a, b illustrated in FIG. 4. Each of the sets of internal components 1102 a, b includes one or more processors 1120, one or more computer-readable RAMs 1122, and one or more computer-readable ROMs 1124 on one or more buses 1126, and one or more operating systems 1128 and one or more computer-readable tangible storage devices 1130. The one or more operating systems 1128, the software program 114 (FIG. 1) and the experience-based virtual support program 108A (FIG. 1) in client computer 102 (FIG. 1), and the experience-based virtual support program 108B (FIG. 1) in network server computer 112 (FIG. 1) are stored on one or more of the respective computer-readable tangible storage devices 1130 for execution by one or more of the respective processors 1120 via one or more of the respective RAMs 1122 (which typically include cache memory). In the embodiment illustrated in FIG. 4, each of the computer-readable tangible storage devices 1130 is a magnetic disk storage device of an internal hard drive. Alternatively, each of the computer-readable tangible storage devices 1130 is a semiconductor storage device such as ROM 1124, EPROM, flash memory or any other computer-readable tangible storage device that can store a computer program and digital information.

Each set of internal components 1102 a, b, also includes a R/W drive or interface 1132 to read from and write to one or more portable computer-readable tangible storage devices 1137 such as a CD-ROM, DVD, memory stick, magnetic tape, magnetic disk, optical disk or semiconductor storage device. A software program, such as an experience-based virtual support program 108A and 108B (FIG. 1), can be stored on one or more of the respective portable computer-readable tangible storage devices 1137, read via the respective R/W drive or interface 1132, and loaded into the respective hard drive 1130.

Each set of internal components 1102 a, b also includes network adapters or interfaces 1136 such as a TCP/IP adapter cards, wireless Wi-Fi interface cards, or 3G or 4G wireless interface cards or other wired or wireless communication links. The experience-based virtual support program 108A (FIG. 1) and software program 114 (FIG. 1) in client computer 102 (FIG. 1), and the experience-based virtual support program 108B (FIG. 1) in network server 112 (FIG. 1) can be downloaded to client computer 102 (FIG. 1) from an external computer via a network (for example, the Internet, a local area network or other, wide area network) and respective network adapters or interfaces 1136. From the network adapters or interfaces 1136, the experience-based virtual support program 108A (FIG. 1) and software program 114 (FIG. 1) in client computer 102 (FIG. 1) and the experience-based virtual support program 108B (FIG. 1) in network server computer 112 (FIG. 1) are loaded into the respective hard drive 1130. The network may comprise copper wires, optical fibers, wireless transmission, routers, firewalls, switches, gateway computers, and/or edge servers.

Each of the sets of external components 1104 *a, b* can include a computer display monitor 1121, a keyboard 1131, and a computer mouse 1135. External components 1104 *a, b* can also include touch screens, virtual keyboards, touch pads, pointing devices, and other human interface devices. Each of the sets of internal components 1102 *a, b* also includes device drivers 1140 to interface to computer display monitor 1121, keyboard 1131, and computer mouse 1135. The device drivers 1140, R/W drive or interface 1132, and network adapter or interface 1136 comprise hardware and software (stored in storage device 1130 and/or ROM 1124).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
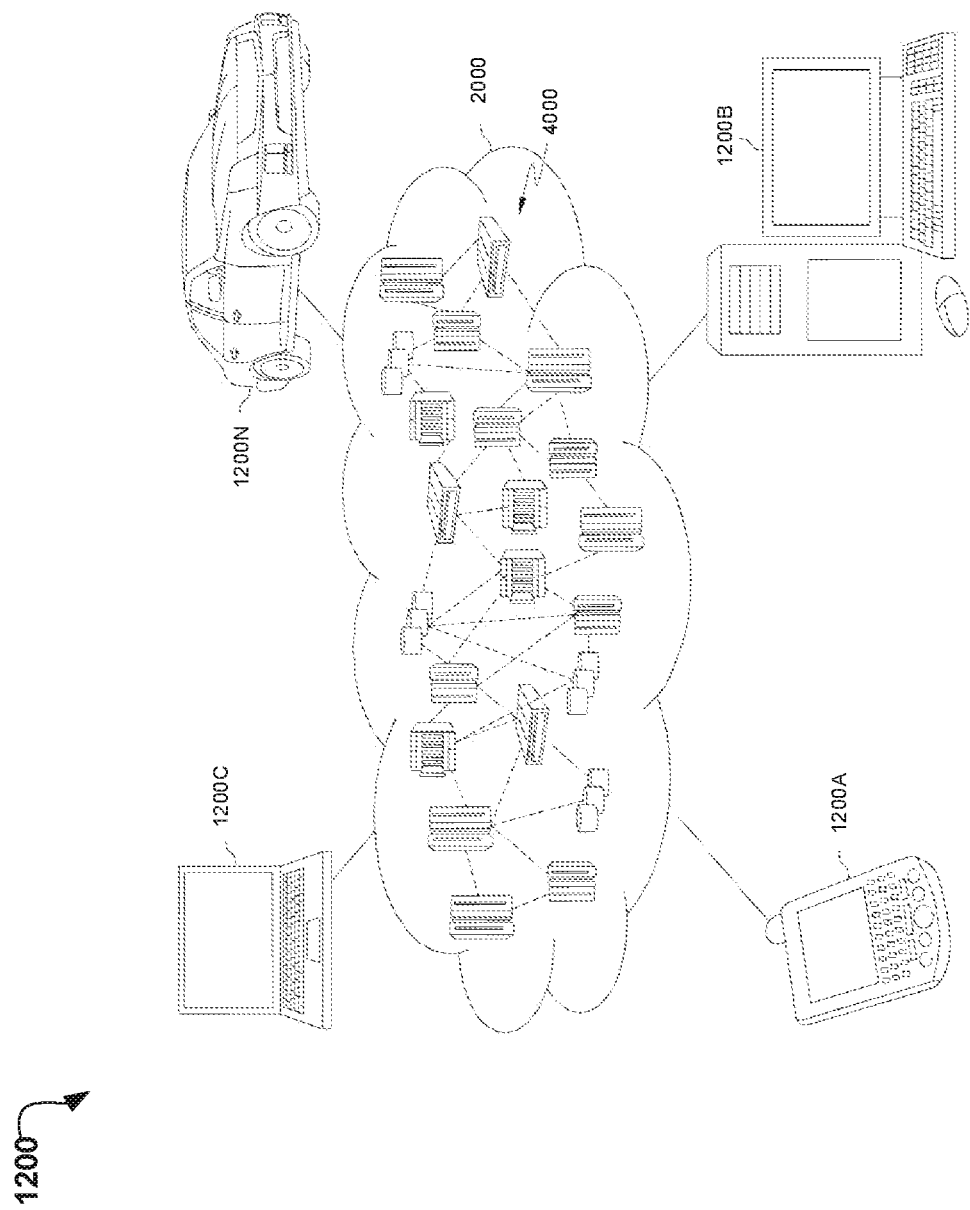
FIG. 5 is a block diagram of an illustrative cloud computing environment including the computer system depicted in FIG. 1, in accordance with an embodiment of the present disclosure.

Referring now to FIG. 5, illustrative cloud computing environment 1200 is depicted. As shown, cloud computing environment 1200 comprises one or more cloud computing nodes 4000 with which local computing devices used by cloud consumers, such as, for example, personal digital assistant (PDA) or cellular telephone 1200A, desktop computer 1200B, laptop computer 1200C, and/or automobile computer system 1200N may communicate. Nodes 4000 may communicate with one another. They may be grouped (not shown) physically or virtually, in one or more networks, such as Private, Community, Public, or Hybrid clouds as described hereinabove, or a combination thereof. This allows cloud computing environment 2000 to offer infrastructure, platforms and/or software as services for which a cloud consumer does not need to maintain resources on a local computing device. It is understood that the types of computing devices 1200A-N shown in FIG. 8 are intended to be illustrative only and that computing nodes 4000 and cloud computing environment 2000 can communicate with any type of computerized device over any type of network and/or network addressable connection (e.g., using a web browser).

Figure 6:
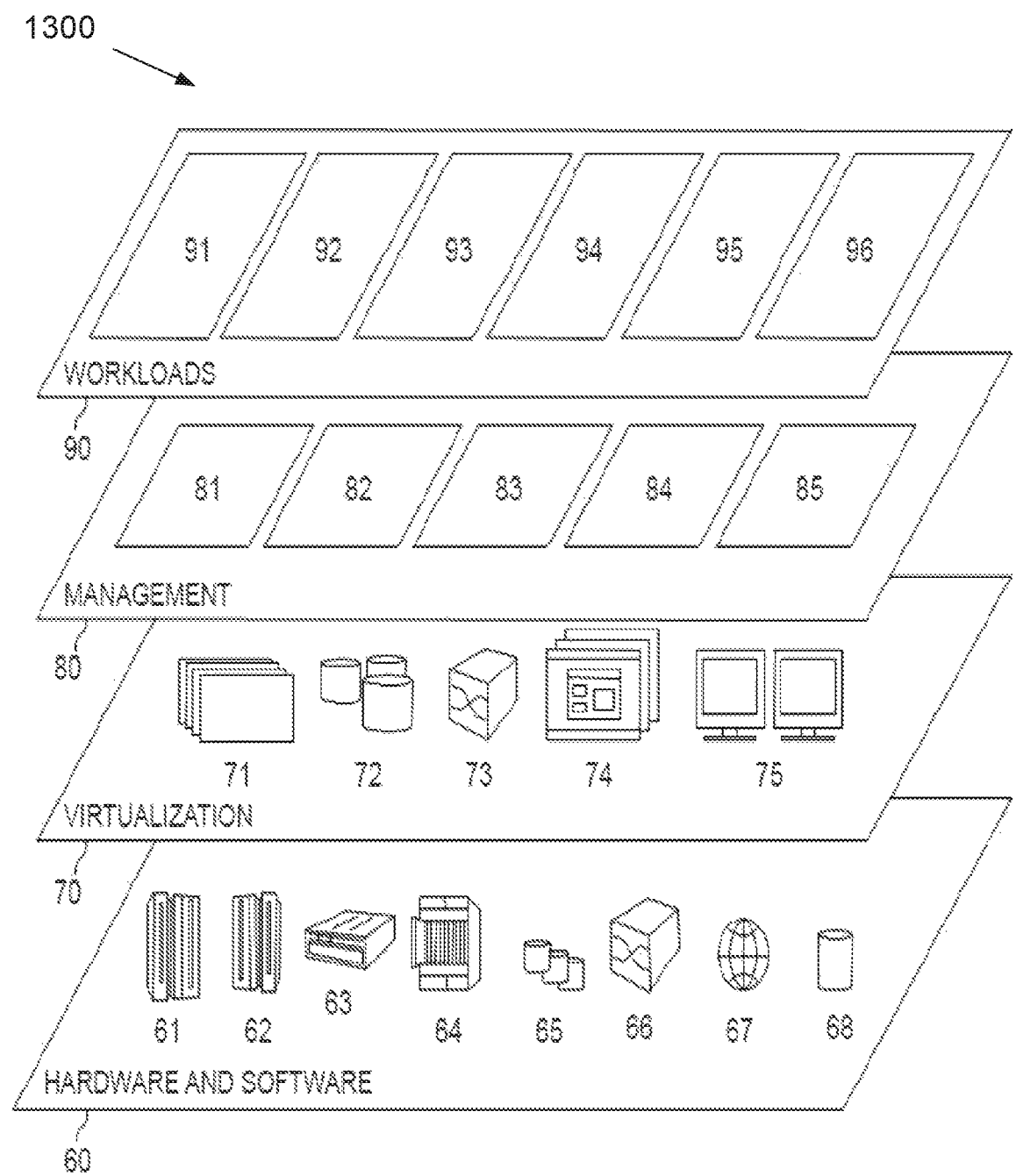
FIG. 6 is a block diagram of functional layers of the illustrative cloud computing environment of FIG. 5, in accordance with an embodiment of the present disclosure.

Referring now to FIG. 6, a set of functional abstraction layers 1300 provided by cloud computing environment 1200 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and experience-based virtual support 96. An experience-based virtual support program 108A, 108B (FIG. 1) may be offered "as a service in the cloud" (i.e., Software as a Service (SaaS)) for applications running on computing devices 102 (FIG. 1) and may, on a computing device, provide machine learning virtual support that generates instructions from virtual support documentation, as well as provides support personnel to an end-user, based on a level of experience associated with the end-user and the support personnel.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatically providing a chatbot interface comprising virtual support instructions tailored to a user expertise, the method comprising:

generating a data mining and machine learning model;

automatically tracking, logging, categorizing, and storing, using the generated data mining and machine learning model, end-user interaction and members of support personnel interactions with a computer application, wherein the end-user interaction and the members of support personnel interactions comprise at least in part an amount of time spent using the computer application and specific actions performed on and in association with the computer application;

based on the automatically tracked, logged, categorized, and stored end-user interaction with the computer application and the members of support personnel interactions with the computer application, determining a level of experience associated with the end-user and the members of a support personnel with the computer application;

in response to detecting one or more first actions on the computer application, automatically generating and providing the chatbot interface and retrieving the virtual support instructions corresponding to the one or more first actions based on virtual support documentation;

automatically altering and tailoring the virtual support instructions according to the determined level of experience associated with the end-user;

presenting the altered and tailored virtual support instructions on the chatbot interface; and in response to detecting one or more second actions on at least one of the computer application and the chatbot interface, using the generated data mining and machine learning model to automatically determine a match between a member of the support personnel and the end-user based on the determined level of experience associated with the end-user and the member of support personnel.

2. The method of claim 1, wherein determining the level of experience associated with the end-user and the members of the support personnel further comprises:

automatically tracking and logging interactions between the end-user and the members of the support personnel based on the computer application; and determining a separate score for each of the end-user and the members of the support personnel based on one or more combinations of the automatically tracked and logged interactions between the end-user and the members of the support personnel, the end-user interaction with the computer application, and the members of support personnel interactions with the computer application.

3. The method of claim 2, wherein the end-user interaction with the computer application further comprises virtual training received by the end-user based on the computer application.

4. The method of claim 3, wherein the members of support personnel interactions with the computer application are selected from a group further comprising at least one of virtual training received by each of the members of the support personnel based on the computer application, an amount of time each of the members of the support personnel spends supporting the computer application, an amount of end-users that each of the members of the support personnel has supported, and feedback received for each of the members of the support personnel.

5. The method of claim 1, wherein detecting the one or more first actions on the computer application further comprises:
   detecting real-time actions performed by the end-user on the computer application, and automatically generating and providing the chatbot interface and retrieving the virtual support instructions corresponding to the detected real-time actions based on the virtual support documentation; or
   detecting that a problem occurs on the computer application, and automatically generating and providing the chatbot interface and retrieving the virtual support instructions corresponding to the problem based on the virtual support documentation.

6. The method of claim 1, wherein detecting the one or more second actions on the computer application further comprises:
   detecting one type of action performed on the chatbot interface, wherein the detected one type of action automatically initiates matching the end-user with the member of the support personnel based on the determined level of experience; or
   detecting and identifying another type of action on the computer application that is different from the altered and tailored virtual support instructions, and automatically matching the end-user with the member of the support personnel based on the determined level of experience.

7. The method of claim 1, wherein automatically determining the match between the member of the support personnel and the end-user based on the determined level of experience associated with the end-user and the member of support personnel further comprises:
   matching a first score associated with the end-user to a second score associated with the member of the support personnel, wherein different scores associated with different members of the support personnel.

8. A computer system for automatically providing a chatbot interface comprising virtual support instructions tailored to a user expertise, comprising:
   one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
   generating a data mining and machine learning model;
   automatically tracking, logging, categorizing, and storing, using the generated data mining and machine learning model, end-user interaction and members of support personnel interactions with a computer application, wherein the end-user interaction and the members of support personnel interactions comprise at least in part an amount of time spent using the computer application and specific actions performed on and in association with the computer application;
   based on the automatically tracked, logged, categorized, and stored end-user interaction with the computer application and the members of support personnel interactions with the computer application, determining a level of experience associated with the end-user and the members of a support personnel with the computer application;
   in response to detecting one or more first actions on the computer application, automatically generating and providing the chatbot interface and retrieving the virtual support instructions corresponding to the one or more first actions based on virtual support documentation;
   automatically altering and tailoring the virtual support instructions according to the determined level of experience associated with the end-user;
   presenting the altered and tailored virtual support instructions on the chatbot interface; and
   in response to detecting one or more second actions on at least one of the computer application and the chatbot interface, using the generated data mining and machine learning model to automatically determine a match between a member of the support personnel and the end-user based on the determined level of experience associated with the end-user and the member of support personnel.

9. The computer system of claim 8, wherein determining the level of experience associated with the end-user and the members of the support personnel further comprises:
   automatically tracking and logging interactions between the end-user and the members of the support personnel based on the computer application; and
   determining a separate score for each of the end-user and the members of the support personnel based on one or more combinations of the automatically tracked and logged interactions between the end-user and the members of the support personnel, the end-user interaction with the computer application, and the members of support personnel interactions with the computer application.

10. The computer system of claim 9, wherein the end-user interaction with the computer application further comprises virtual training received by the end-user based on the computer application.

11. The computer system of claim 9, wherein the members of support personnel interactions with the computer application are selected from a group further comprising at least one of virtual training received by each of the members of the support personnel based on the computer application, an amount of time each of the members of the support personnel spends supporting the computer application, an amount of end-users that each of the members of the support personnel has supported, and feedback received for each of the members of the support personnel.

12. The computer system of claim 8, wherein detecting the one or more first actions on the computer application further comprises:
   detecting real-time actions performed by the end-user on the computer application, and automatically generating and providing the chatbot interface and retrieving the virtual support instructions corresponding to the detected real-time actions based on the virtual support documentation; or detecting that a problem occurs on the computer application, and automatically generating and providing the chatbot interface and retrieving the virtual support instructions corresponding to the problem based on the virtual support documentation.

13. The computer system of claim 11, wherein detecting the one or more second actions on the computer application further comprises:

detecting one type of action performed on the chatbot interface, wherein the detected one type of action automatically initiates matching the end-user with the member of the support personnel based on the determined level of experience; or detecting and identifying another type of action on the computer application that is different from the altered and tailored virtual support instructions, and automatically matching the end-user with the member of the support personnel based on the determined level of experience.

14. The computer system of claim 8, wherein automatically determining the match between the member of the support personnel and the end-user based on the determined level of experience associated with the end-user and the member of support personnel further comprises:

matching a first score associated with the end-user to a second score associated with the member of the support personnel, wherein different scores associated with different members of the support personnel.

15. A computer program product for automatically providing a chatbot interface comprising virtual support instructions tailored to a user expertise, comprising:

one or more tangible computer-readable storage devices and program instructions stored on at least one of the one or more tangible computer-readable storage devices, the program instructions executable by a processor, the program instructions comprising:

program instructions to generate a data mining and machine learning model;

program instructions to automatically track, log, categorize, and store, using the generated data mining and machine learning model, end-user interaction and members of support personnel interactions with a computer application, wherein the end-user interaction and the members of support personnel interactions comprise at least in part an amount of time spent using the computer application and specific actions performed on and in association with the computer application;

based on the automatically tracked, logged, categorized, and stored end-user interaction with the computer application and the members of support personnel interactions with the computer application, program instructions to determine a level of experience associated with the end-user and the members of a support personnel with the computer application;

program instructions to, in response to detecting one or more first actions on the computer application, automatically generate and provide the chatbot interface and retrieve the virtual support instructions corresponding to the one or more first actions based on virtual support documentation;

program instructions to automatically alter and tailor the virtual support instructions according to the determined level of experience associated with the end-user;

program instructions to present the altered and tailored virtual support instructions on the chatbot interface; and program instructions to, in response to detecting one or more second actions on at least one of the computer application and the chatbot interface, using the generated data mining and machine learning model to automatically determine a match between a member of the support personnel and the end-user based on the level of experience associated with the end-user and the member of support personnel.

16. The computer program product of claim 15, wherein the program instructions to determine the level of experience associated with the end-user and the members of the support personnel further comprises:

program instructions to automatically track and log interactions between the end-user and the members of the support personnel based on the computer application; and program instructions to determine a separate score for each of the end-user and the members of the support personnel based on one or more combinations of the automatically tracked and logged interactions between the end-user and the members of the support personnel, the end-user interaction with the computer application, and the members of support personnel interactions with the computer application.

17. The computer program product of claim 16, wherein the end-user interaction with the computer application further comprises virtual training received by the end-user based on the computer application.

18. The computer program product of claim 16, wherein the members of support personnel interactions with the computer application are selected from a group further comprising at least one of virtual training received by each of the members of the support personnel based on the computer application, an amount of time each of the members of the support personnel spends supporting the computer application, an amount of end-users that each of the members of the support personnel has supported, and feedback received for each of the members of the support personnel.

19. The computer program product of claim 15, wherein the program instructions to detect the one or more first actions on the computer application further comprises:

program instructions to detect real-time actions performed by the end-user on the computer application, and program instructions to automatically generate and provide the chatbot interface and retrieve the virtual support instructions corresponding to the detected real-time actions based on the virtual support documentation; or program instructions to detect that a problem occurs on the computer application, and program instructions to automatically generate and provide the chatbot interface and retrieve the virtual support instructions corresponding to the problem based on the virtual support documentation.

20. The computer program product of claim 15, wherein the program instructions to detect the one or more second actions on the computer application further comprises:

program instructions to detect one type of action performed on the chatbot interface, wherein the detected one type of action automatically initiates matching the end-user with the member of the support personnel based on the determined level of experience; or program instructions to detect and identify another type of action on the computer application that is different from the altered and tailored virtual support instructions, and automatically match the end-user with the member of the support personnel based on the determined level of experience.

* * * * *